United States Patent
Schulken

(10) Patent No.: US 8,915,739 B2
(45) Date of Patent: Dec. 23, 2014

(54) COLORING SHEET

(75) Inventor: Toni M. Schulken, Charlotte, NC (US)

(73) Assignee: Acco Brands Corporation, Lake Zurich, IL (US)

( * ) Notice: Subject to any disclaimer, the term of this patent is extended or adjusted under 35 U.S.C. 154(b) by 1790 days.

(21) Appl. No.: 11/847,815

(22) Filed: Aug. 30, 2007

(65) Prior Publication Data

US 2009/0061394 A1 Mar. 5, 2009

(51) Int. Cl.
  *G09B 11/00* (2006.01)
  *G09B 11/04* (2006.01)
  *G09B 11/10* (2006.01)
  *B43L 13/00* (2006.01)

(52) U.S. Cl.
  CPC ............... *G09B 11/04* (2013.01); *B43L 13/00* (2013.01); *B43L 13/007* (2013.01)
  USPC ................... 434/84; 434/81; 434/85; 434/87; 434/88

(58) Field of Classification Search
  USPC ........................................................... 434/84
  See application file for complete search history.

(56) References Cited

U.S. PATENT DOCUMENTS

| | | | | |
|---|---|---|---|---|
| 716,629 | A * | 12/1902 | Dodge | 434/164 |
| 1,372,360 | A * | 3/1921 | McNeill | 434/117 |
| 1,797,552 | A * | 3/1931 | Henriksen | 428/156 |
| 2,371,153 | A * | 3/1945 | Connelly | 434/84 |
| 2,454,632 | A * | 11/1948 | Cohn | 434/159 |
| 2,616,198 | A * | 11/1952 | Sewell | 434/112 |
| 3,040,447 | A * | 6/1962 | Baldanza | 434/84 |
| 3,247,604 | A * | 4/1966 | Davis | 434/84 |
| 3,314,171 | A * | 4/1967 | Bethune | 434/164 |
| 3,570,139 | A * | 3/1971 | Ladd | 434/346 |
| 3,574,956 | A * | 4/1971 | Hamelin | 434/425 |
| 3,633,286 | A * | 1/1972 | Maurer | 434/87 |
| 3,744,152 | A * | 7/1973 | Crasilneck | 434/84 |
| 4,073,070 | A * | 2/1978 | Boston | 434/84 |
| 4,626,219 | A * | 12/1986 | Goldreyer | 434/162 |
| 4,650,421 | A * | 3/1987 | Anczurowski | 434/113 |
| 4,737,108 | A * | 4/1988 | Chepaitis | 434/113 |
| 4,746,123 | A * | 5/1988 | Skirvin | 434/88 |
| 4,878,844 | A * | 11/1989 | Gasper et al. | 434/159 |
| 5,016,452 | A * | 5/1991 | Alexander | 434/81 |
| 5,173,324 | A * | 12/1992 | Newhart | 427/11 |
| 5,203,702 | A * | 4/1993 | Wilson | 434/85 |
| 5,217,378 | A * | 6/1993 | Donovan | 434/116 |
| 5,292,255 | A * | 3/1994 | Goldwasser | 434/84 |
| 6,228,427 | B1* | 5/2001 | Wanger | 427/258 |
| 6,722,889 | B1* | 4/2004 | Page et al. | 434/251 |
| 6,786,728 | B2* | 9/2004 | Leblanc et al. | 434/84 |
| 6,843,726 | B1* | 1/2005 | Nomi et al. | 463/43 |
| 7,110,619 | B2* | 9/2006 | Frohlich et al. | 382/292 |
| 7,118,135 | B2* | 10/2006 | Tims et al. | 434/85 |

(Continued)

OTHER PUBLICATIONS

New! *Therapro Original Alphabet Coloring Sheets*, http://www.theraproducts.com/index.php?main_page=product_therapro_info&cPath=307743-_307746&products_id=321043 (Jan. 14, 2006).

*Primary Examiner* — Nikolai A Gishnock
(74) *Attorney, Agent, or Firm* — Thompson Hine L.L.P.

(57) ABSTRACT

A coloring sheet including a sheet of paper and a design formed on the sheet of paper. The design is at least partially formed by a pair of parallel, adjacent raised lines, wherein the adjacent raised lines are spaced apart by a distance of less than about 13 mm ½ inch).

26 Claims, 3 Drawing Sheets

(56) References Cited

U.S. PATENT DOCUMENTS

| | | | |
|---|---|---|---|
| 7,458,813 B2 * | 12/2008 | Olsen et al. | 434/160 |
| 7,717,469 B2 * | 5/2010 | Tims et al. | 283/45 |
| 7,972,138 B2 * | 7/2011 | Hachey et al. | 434/85 |
| 8,057,232 B2 * | 11/2011 | Haberstroh et al. | 434/85 |
| 8,313,329 B2 * | 11/2012 | Haberstroh et al. | 434/85 |
| 2005/0106537 A1 * | 5/2005 | Chepaitis | 434/114 |
| 2006/0014133 A1 * | 1/2006 | Olsen et al. | 434/409 |
| 2008/0070200 A1 * | 3/2008 | Hachey et al. | 434/85 |
| 2009/0061395 A1 * | 3/2009 | Schulken | 434/85 |
| 2010/0105014 A1 * | 4/2010 | Haberstroh et al. | 434/88 |
| 2012/0058454 A1 * | 3/2012 | Haberstroh et al. | 434/85 |

* cited by examiner

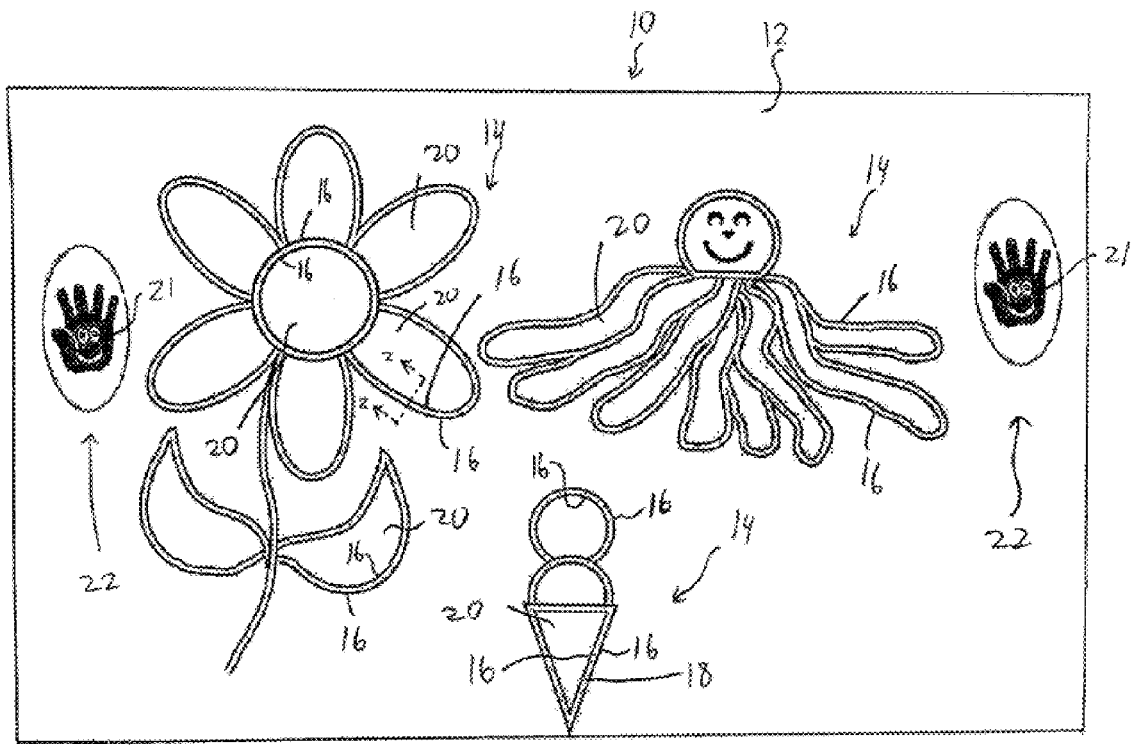
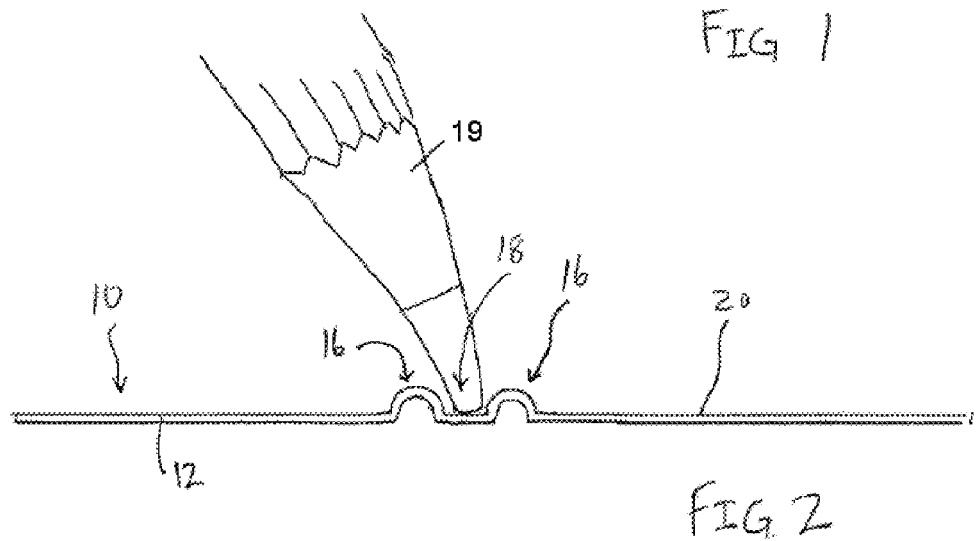

COLORING SHEET

The present invention is directed to a coloring sheet, and, more particularly, to a coloring sheet with raised lines to guide a user's tracing and/or coloring.

BACKGROUND

Preschool children and others learning to draw or write may utilize tools, guides or the like to aid in their development. Such tools, guides or the like may help to develop the user's writing instrument control skills, visual motor control skills, fine motor control skills, visual perception skills and bilateral coordination skills. The development of these skills helps to advance and improve the user's writing and drawing skills.

SUMMARY

In one embodiment, the invention is a coloring sheet including a sheet of paper and a design formed on the sheet of paper. The design is at least partially formed by a pair of parallel, adjacent raised lines, wherein the adjacent raised lines are spaced apart by a distance of less than about 13 mm (½ inch).

BRIEF DESCRIPTION OF THE DRAWINGS

FIG. 1 is a top view of a coloring sheet;
FIG. 2 is a side cross section taken along line 2-2 of FIG. 1.

DETAILED DESCRIPTION

Figure 3:
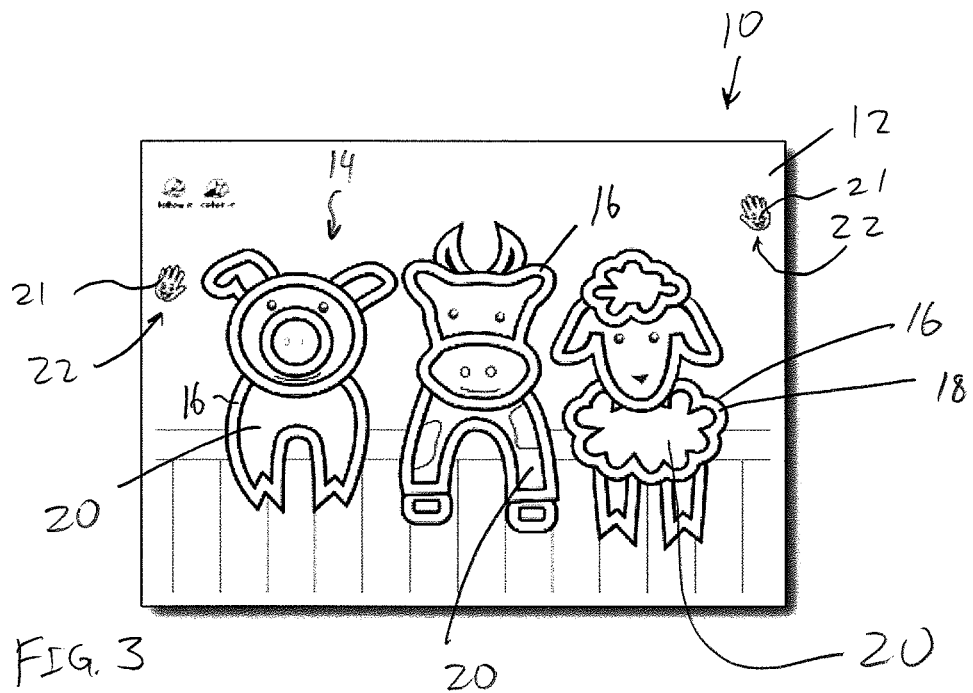
FIG. 3 is a top view of another coloring sheet.

As shown in FIG. 1, in one embodiment the coloring sheet 10 of the present invention include a coloring surface or sheet of paper 12 with one or more (three, in the illustrated embodiment) designs 14 formed on the sheet of paper 12. Each design 14 can take any of a variety of recognizable objects or shapes, such as animals, flowers, objects, designs, people, etc. Although each design 14 can take the form of alphanumeric characters, in one embodiment the designs 14 are not alphanumeric characters.

The sheet of paper 12 can be made from any of a wide variety of materials, but will typically be made of a cellulose-based or pulp-based paper such that the paper 12 is generally water absorbent and can be written upon a wide variety of media (i.e., pens, pencils, markers, crayons etc.) The sheet 12 may be relatively thin, and may have a thickness of about 0.5 mm (0.02 inches) or less. However, the sheet 12 can be made of any of a relatively wide variety of materials, and need not necessarily be of a water-absorbent material (i.e. could be a write-on/wipe off (polymer) material that can be re-used, etc.) The sheet 12 may be of a generally white color to encourage coloring thereon, such as by crayon or the like. However, the sheet 12 can be any of a variety of other colors.

Each design 14 may be at least partially designed or formed by a pair of parallel, adjacent raised lines 16 (i.e. each line of the designs 14 of FIG. 1 represents an raised line). As shown in FIG. 2, each raised line 16 may be permanently raised, and may be an embossed line defined by a deformation of the sheet 12. However, besides embossing each raised line 16 can be formed by other structure, such as by an area of increased thickness of the sheet 12, an area of built-up ink or other materials (i.e. by thermography), or the like. Each pair of raised lines 16 may be curved or straight as desired to provide the desired design 14. As can be seen, various pairs of intersecting abutting raised lines 16 forming non-parallel angles may be utilized to form a single design 14 or part of a design 14.

Each pair of raised lines 16 may define a gap 18 therebetween. Each gap 18 is sized and shaped to receive the tip of a writing instrument 19 therein to guide the writing instrument 19 as the user guides the writing instrument 19 between the raised lines 16. In this manner a user can write along the length of the gap 18 as the writing instrument 19 is drawn along the length of the raised lines 16. The raised lines 16 help to keep the writing instrument 19 retained between the lines 16 and within the gap 18, thereby increasing the user's skill and success with visual motor control.

The gap 18 may be sufficiently small, and/or the writing instrument 19 may be sufficiently large, such that when the writing instrument 19 writes along the bottom of the gap 18 the writing instrument 19 simultaneously engages both opposed raised lines 16. This feature can be useful for a user who needs to develop more basic writing/drawing skills, and to encourage the user's confidence. Alternately, if desired, the gap 18 may be sufficiently large, and/or the writing instrument 19 may be sufficiently small, such that when writing instrument 19 writes along the bottom of the gap 18 the writing instrument 19 does not engage either raised line 16 if the writing instrument 19 is sufficiently centered. In this case, when the user strays sufficiently off center, the writing instrument 19 will engage one of the raised lines 16, thereby guiding the writing instrument 19 and providing tactile feedback to the user.

Thus the size (i.e. horizontal dimension of the flat area between the raised lines 16) of the gap 18 can be adjusted as desired, and may have a size of less than about 13 mm (½"), and may range between about 1.5 mm (⅟₁₆") and about 13 mm (½"). Each raised line 16 can have a height that is between about 0.05 mm (0.002") and about 1 mm (0.04"), and more particularly between about 0.1 mm (0.004") and about 0.4 mm (0.016") above the remainder of the sheet 12 to provide sufficient height to provide guidance and feedback, but not to be so high as to block the writing instrument 19 from writing/drawing on the gap 18.

A user can thus fill in or color the outer perimeter of the design 14, or other areas of the design 14, defined by the raised lines 16 by guiding the writing instrument 19 between the raised lines 16 in the manner described above. Differing colors can be used in the differing gaps 18 as desired. For example, for the flower design 14 shown in FIG. 1, a green writing instrument can be used in the raised lines 16 defining the stem and leaves of the flower; a yellow writing instrument can be used in the raised lines 16 defining the leaves; and a black writing instrument can be used in the raised lines 16 defining the center of the flower.

Moreover, the generally closed areas (or "field" areas) 20 defined or bounded by the raised lines 16 can also be colored, as desired. The field areas 20 can be colored with the same color as that used in the outer perimeter pair of raised lines 16, or with a differing color. For example, returning to the example of the flower of FIG. 1, green may be used to color the leaf areas to provide a color matching the border, and red may be used to color the petals to provide a color that contrasts with the border. The inner raised line 16 defining the field area 20 provides tactile feed back when coloring the field area 20 so that the user can determine when their writing instrument 19 is approaching the outer edge of the field area 20, which helps to build confidence (with coloring inside the boundaries) and encourages further development. Thus each pair of raised lines 16 can serve the dual purpose of allowing "boundary" lines to be drawn in a guided manner, while also serving as a guide for field coloring of the generally closed areas 20.

Various sheets 12 can be bound together to provide a coloring book including various sheets 12 as described herein. Each sheet 12 may include only a single design 14, or, if desired, can include multiple designs 14 thereon.

Each sheet 10 may include or carry thereon at least one hand cue 22 upon which a user can place his or her hand to manually stabilize the sheet 10 during use 22. Each hand cue 22 may include or take the form of a visual cue 21. In the illustrated embodiment, the visual cue 21 takes the form of a visual representation (i.e. drawing, design, photograph or the like) of a hand to cue or encourage a user to place his or her hand on the hand cue 22. However, the visual cue 21 can take the form of other indicia besides a hand. For example some other indicia 21 (by way of example, a star, or the letter "H," although nearly any sort of indicia can be used) may be provided on the sheet 10. A user may be taught (i.e. by the sheet 10, by associated instructions/packaging, by a teacher or parent, etc.) that the indicia 21 is to be associated with hand stabilization. In this case, when a user sees the visual cue 21 the user is prompted to stabilize the sheet 10 with his or her non-dominant (i.e. non-writing) hand.

Teachers typically have difficulty ensuring that their students properly stabilize their sheets 10 during use. Accordingly, the hand cues 22 serve as a constant reminder to the user to encourage proper stabilization and use of the sheet 10.

Each hand cue 22 may be positioned at or adjacent to the outer perimeter of the sheet 10 to ensure proper hand placement. In particular, encouraging a user to place his or her stabilization hand at or adjacent to the outer edge of the sheet 10 ensures that maximum stabilization force is exerted while ensuring that the stabilization hand does not interfere with writing operations on the sheet 10. Thus, at least part of each hand cue 22 may be located within about 75 mm (3 inches) of the outer edge of the sheet 10, or within about 10% or 20% of the height or width of the sheet 10 of the outer edge.

Figure 4:
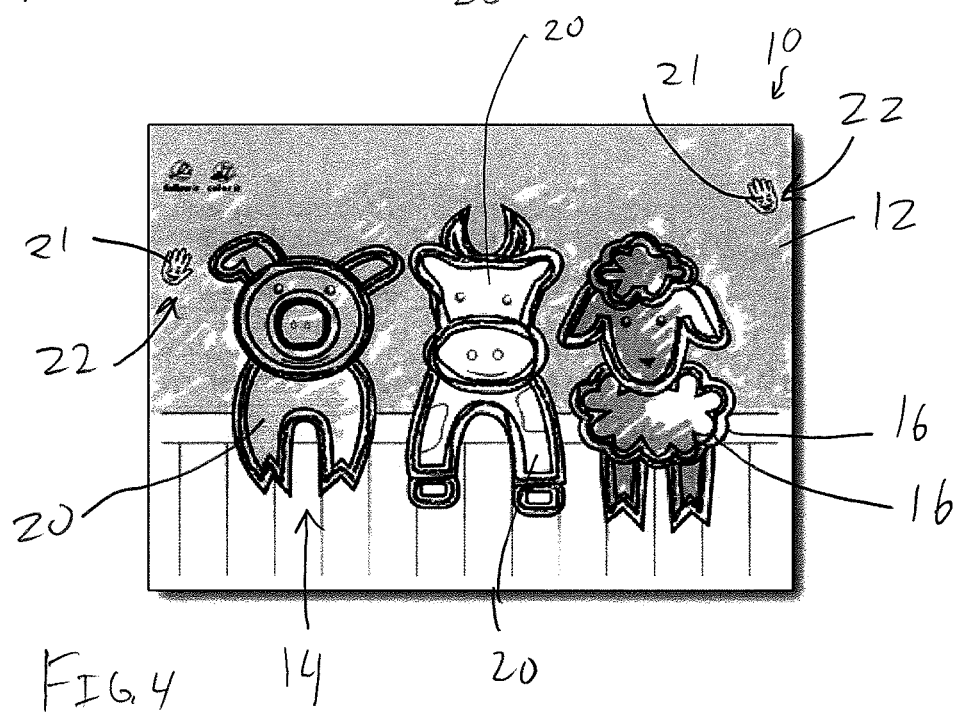
FIG. 4 is a top view of the sheet of FIG. 3, with the sheet partially colored.

The sheet 10 may include a hand cue 22 on both the left and right sides of the sheet 10 (with the "left" and "right" orientation being taken from the perspective of a user viewing the sheet in a normal configuration as shown in FIG. 1.) The use of two opposed hand cues 22 ensures that a hand cue 22 is sufficiently presented and available for both left-handed and right-handed users. As best shown in FIGS. 3 and 4, both hand cues 22 may be located in the upper half of the drawing sheet 12 since stabilization in the upper half of the sheet 12 is most effective and allows full access to the drawing sheet. Moreover, the hand cue 22 on the left side of the sheet 12 (utilized by right-handed users) is positioned below the hand cue 22 on the right side of the sheet 12 (utilized by left-handed users). Due to the layout of most drawing sheets, as well as orientation of writing desks, etc. it is desired to place the hand cue 22 for left-handed users higher on the sheet 12 than the other hand cue 22. In particular, due the differing ways in which a left-handed user typically positions and stabilizes paper compared to a right-handed user, the right cue 22 is optimally positioned higher on the sheet 10.

Figure 5:
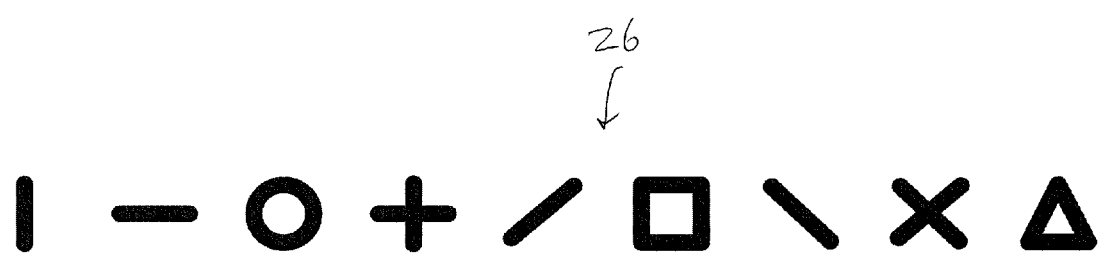
FIG. 5 illustrates the nine pre-writing shapes.

The development of pre-writing shapes is important in developing proper writing and drawing skills. In particular, the nine pre-writing shapes 26, as shown in FIG. 5, consist of a vertical line, a horizontal line, a circle, a cross (also known more specifically as a horizontal and vertical cross), a right oblique, a square, a left oblique, an "X" (also known more specifically as an oblique cross), and a triangle. These pre-writing shapes 26 can be arranged to create all of the capital letters of the English alphabet (or the Latin alphabet) and therefore are important building blocks for a user to learn and build upon. The designs 14 of each sheet 10 may therefore incorporate the pre-writing shapes 26, or similar variants thereof, to encourage familiarity with the shapes 26 and practice drawing them. The use of the pre-writing shapes 26 develops visual motor integration which is important in the development of writing, coloring and drawing skills.

Coloring within boundaries is an important skill that facilitates the development of visual discrimination (the ability to recognize subtle differences) which is needed for alignment of letters (on lined paper) and proofreading skills. Tracing around an area before coloring the area also increases the user's ability to successfully color the area within the lines, and also develops the visual motor control to draw within pathways. Coloring also develops writing instrument control. Tracing around an area before coloring is one strategy that increases a child's success with coloring within the lines.

Moreover, coloring within narrow pathways develops fine motor control and is a prerequisite for writing on lined paper. These tasks also develop visual tracking skills which facilitates reading and writing fluency, and precision at the fingertips which allows for writing more efficiently and with decreased letter size. The sheet 10 may be packaged for sale along with a set of instructions that instruct a user (or a user's parents, teachers, etc.) to use the sheet 10 in the manner described herein.

Having described the invention in detail and by reference to the various embodiments, it should be understood that modifications and variations thereof are possible without departing from the scope of the invention.

What is claimed is:

1. A coloring sheet comprising:
a sheet of paper; and
a writing instrument guide on said sheet of paper, said writing instrument guide being at least partially formed by a pair of parallel, adjacent raised lines, each raised line being raised relative to a generally planar surface defining a majority of a surface area of a side of said sheet of paper, said parallel, adjacent raised lines being spaced apart by a distance of less than about ½ inch thereby defining a gap therebetween;
wherein at least one of said raised lines at least partially defines a generally closed field area to be colored therein, said generally closed field area being positioned externally of said gap.

2. The coloring sheet of claim 1 wherein said pair of parallel, adjacent raised lines includes a curved portion.

3. The coloring sheet of claim 1 wherein said writing instrument guide defines a representation of a recognizable object or shape on said sheet of paper.

4. The coloring sheet of claim 3 wherein said recognizable object or shape is not an alphanumeric character.

5. The coloring sheet of claim 1 wherein said parallel, adjacent raised lines and said gap extend around the entire perimeter of the generally closed field area to be colored.

6. The sheet of claim 1 further comprising a supplemental writing instrument guide being at least partially formed by a supplemental pair of parallel, adjacent raised lines spaced apart by a distance of no more than about ½ inch thereby defining a supplemental gap between said supplemental pair of parallel, adjacent raised lines, and wherein said pair of parallel, adjacent raised lines and said supplemental pair of parallel, adjacent raised lines abut against each other at a non-parallel angle.

7. The sheet of claim 1 wherein said raised lines each have a height between about 0.05 mm and about 1 mm.

8. A sheet comprising:
   a sheet of paper; and
   a writing instrument guide on said sheet of paper, said writing instrument guide being at least partially formed by a pair of parallel, adjacent raised lines, said adjacent raised lines being spaced apart by a distance of less than about ½ inch thereby defining a gap between said parallel, adjacent raised lines, each raised line being raised relative to a plane defined by a majority of a surface area of a side of said sheet of paper.

9. The sheet of claim 8 further comprising a supplemental writing instrument guide being at least partially formed by a supplemental pair of parallel, adjacent raised lines spaced apart by a distance of no more than about ½ inch.

10. The sheet of claim 9 wherein said pair of parallel, adjacent raised lines and said supplemental pair of parallel, adjacent raised lines abut against each other at a non-parallel angle.

11. The sheet of claim 8 wherein said sheet of paper includes a hand cue for cuing a user to place the user's hand thereon to manually stabilize said sheet of paper during use.

12. The sheet of claim 11 wherein said hand cue is positioned at or adjacent to an outer perimeter of said sheet of paper.

13. The sheet of claim 8 further comprising a set of instructions packaged with said sheet of paper, said set of instructions instructing a user to insert a writing instrument in between said pair of parallel, adjacent raised lines and to draw along a length of said pair of parallel, adjacent raised lines using said pair of parallel, adjacent raised lines as a guide.

14. The sheet of claim 13 wherein at least one of said parallel, adjacent raised lines at least partially defines a generally closed shape, and wherein said instructions instruct a user to color said generally closed shape using said at least one of said parallel, adjacent raised lines to provide tactile feedback during the coloring.

15. The sheet of claim 8 wherein said sheet of paper has a thickness of less than about 0.5 mm.

16. The sheet of claim 8 wherein said pair of parallel, adjacent raised lines includes a curved portion.

17. The sheet of claim 8 wherein said writing instrument guide defines a representation of a recognizable object or shape on said sheet of paper.

18. The sheet of claim 8 wherein said parallel, adjacent raised lines and said gap extend around the entire perimeter of a field area of said sheet of paper.

19. The sheet of claim 8 wherein each raised line is an embossed line.

20. The sheet of claim 8 wherein said raised lines each have a height between about 0.05 mm and about 1 mm.

21. A coloring sheet comprising:
   a sheet of paper; and
   a writing instrument guide on said sheet of paper, wherein said writing instrument guide defines a representation of a recognizable object or shape that is not an alphanumeric character, and wherein said writing instrument guide is at least partially formed by a pair of parallel, adjacent raised lines having a gap therebetween, said writing instrument guide defining an area to be colored, wherein said area to be colored is external of said gap, each raised line being raised relative to a plane defined by a majority of a surface area of a side of said sheet of paper.

22. The sheet of claim 21 wherein said raised lines each have a height between about 0.05 mm and about 1 mm.

23. A sheet comprising:
   a sheet of paper;
   a first raised line protruding vertically upward from a horizontal plane of the sheet of paper; and
   a second raised line protruding vertically upward from the horizontal plane of said sheet of paper, the second raised line positioned parallel with and adjacent to the first raised line to define a gap therebetween having a width of less than about ½ inch, the gap including a gap surface positioned below an upper surface of said first and second raised lines;
   wherein the first raised line defines at least a portion of a boundary of a generally closed field area; and
   wherein the second raised line is outside of the generally closed field area.

24. The sheet of claim 23 wherein said raised lines each have a height between about 0.05 mm and about 1 mm.

25. The sheet of claim 23 wherein said gap between said first raised line and said second raised line has a uniform width.

26. The sheet of claim 23 wherein said gap surface is in plane with said horizontal plane of the sheet of paper.

* * * * *